United States Patent [19]

Gooch

[11] Patent Number: 5,130,876
[45] Date of Patent: Jul. 14, 1992

[54] SOLID STATE SCANNING TRANSDUCER THAT UTILIZES LOW FLUX DENSITIES

[75] Inventor: Beverley R. Gooch, Sunnyvale, Calif.

[73] Assignee: Ampex Corporation, Redwood City, Calif.

[21] Appl. No.: 449,195

[22] Filed: Dec. 8, 1989

[51] Int. Cl.⁵ .......................... G11B 5/33; G11B 5/17; G11B 5/127; G11B 5/23
[52] U.S. Cl. .................................. 360/115; 360/123; 360/125; 360/119
[58] Field of Search ............... 360/115, 125, 119, 123, 360/121, 128

[56] References Cited

U.S. PATENT DOCUMENTS

| | | | |
|---|---|---|---|
| 3,084,227 | 4/1963 | Peters | 360/115 |
| 3,106,617 | 10/1963 | Fox | 360/119 |
| 3,175,049 | 3/1965 | Gabor | 360/115 |
| 3,314,056 | 4/1967 | Lawrance | 360/119 |
| 3,382,325 | 5/1968 | Camras | 360/119 |
| 3,391,254 | 7/1968 | Honig | 360/115 |
| 3,435,440 | 3/1969 | Nallin | 360/115 |
| 3,696,216 | 10/1972 | Sugaya et al. | 360/115 |
| 3,845,503 | 10/1974 | Kanai | 360/115 |
| 4,322,763 | 3/1982 | Lemke | 360/115 |
| 4,423,450 | 12/1983 | Hamilton | 360/123 |
| 4,530,016 | 7/1985 | Sawazaki | 360/55 |
| 4,787,002 | 11/1988 | Isozaki | 360/123 |

FOREIGN PATENT DOCUMENTS

WO87/03729 6/1987 World Int. Prop. O. .

*Primary Examiner*—John H. Wolff
*Assistant Examiner*—Craig A. Renner
*Attorney, Agent, or Firm*—James A. LaBarre; Ralph L. Mossino

[57] ABSTRACT

A magnetic transducer arrangement includes a core with a gap and a body of magnetically anisotropic material in which a signal transfer region is defined. Control flux flows across the gap of the core and through the body in opposite directions. The two oppositely directed flux flows influence one another and tend to cancel each other to define a null zone. This null zone, in which the flow of control flux is very low, is sensitive to flux emanating from an adjacent magnetic storage medium and therefore defines the signal transfer region. By varying the relative proportions of control flux flowing in the opposite directions, the location of the null zone can be varied along the width of the magnetic transducer to thereby scan the signal transfer region. The flux which is coupled from the magnetic storage medium into the null zone of the body does not flow through the magnetic core in a manner similar to a fringing flux. Rather, this flux is used to modulate a reference flux, and this modulation is detected to reproduce the recorded information. In a recording mode, information flux reduces the permeability of the signal transfer region, causing the flux to fringe from the body and be coupled into the storage medium.

38 Claims, 13 Drawing Sheets

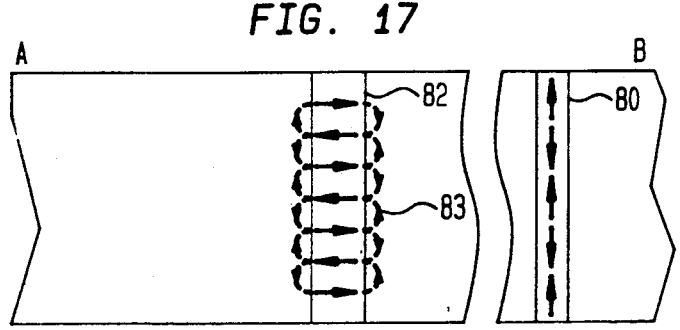
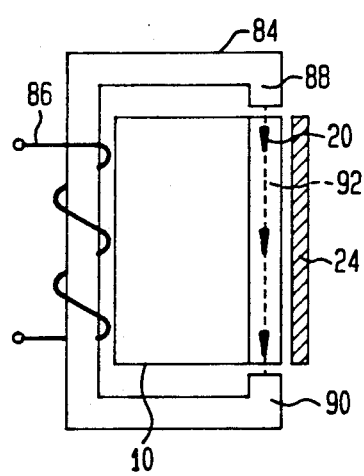
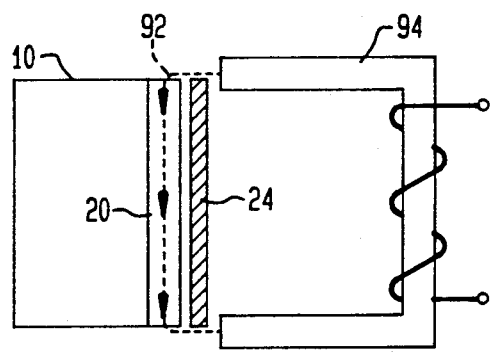
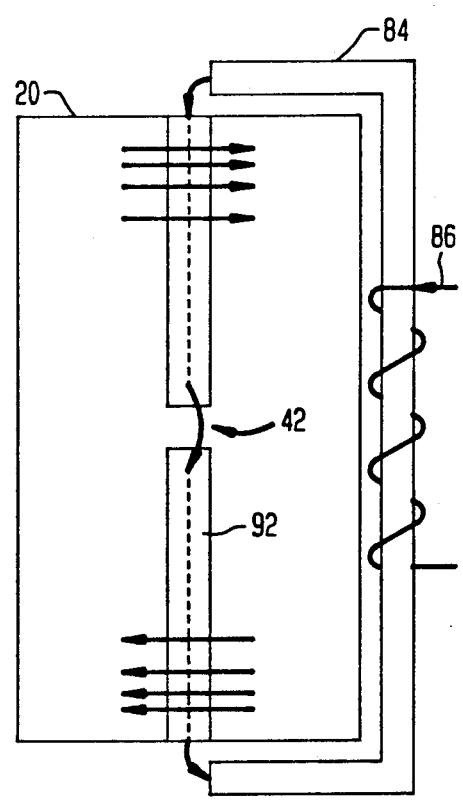

SOLID STATE SCANNING TRANSDUCER THAT UTILIZES LOW FLUX DENSITIES

BACKGROUND OF THE INVENTION

The present invention is generally directed to magnetic transducers of the type that are used to transfer information between a signal generation or utilization device and a magnetic storage medium, such as a magnetic tape-or disk. More particularly, the present invention is directed to a solid state scanning transducer in which portions of the transducer are selectively activated to record and/or reproduce information along different portions of the storage medium.

Generally speaking, a magnetic transducer of the type to which the present invention pertains typically comprises a core of high permeability magnetic material that is provided with a non-magnetic gap between two magnetic poles. This gap interrupts the path of flux flowing within the core to cause the flux to fringe from the core at the gap. In a conventional transducer, this fringing flux is directly coupled into the magnetic storage medium. Varying or modulating the magnitude and/or polarity of the flux in accordance with information of interest orients the direction of magnetic dipoles in the magnetic storage medium, thereby recording the information. Thereafter, flux which is produced by the dipoles is coupled to flow in the flux path defined by the core, and be detected by an appropriately positioned winding to reproduce the recorded information. This flux, which is modulated in accordance with the information of interest, is referred to as "signal flux."

In a conventional magnetic transducer, the coupling of signal flux between the storage medium and the transducer takes place across the entire width of the transducer. In this context, the "width" of the transducer is defined as the dimension that is parallel to the interface between the core and the medium, and orthogonal to the direction of flux flow around the magnetic core and across the gap. During the recording of time varying information on the storage medium, the storage medium and the transducer are moved relative to one another. This relative motion is effected in various ways leading to a number of different recording formats. In one format, a storage medium such as a tape is transported past the transducer in a longitudinal direction perpendicular to the width of the transducer. In this format, the information is recorded on the tape in a track which is coextensive with the length of the tape.

In an effort to increase the amount of information recorded on a tape, it has been known to move the transducer mechanically at a high speed relative to the tape, to scan its gap across the width of the tape. In devices recording information in this fashion, the width of the transducer is much less than that of the tape, and the transducer is moved across the tape in a direction that is transverse to the longitudinal direction in which the tape is transported.

For example, in some transducing arrangements the transducer is mounted on a drum that rotates about an axis generally parallel to the direction of tape transport. As a result of this movement, the transducer defines a track which is substantially perpendicular to the longitudinal dimension of the tape. Repeated scanning of the transducer in this manner, coupled with the transport of the tape in its longitudinal direction, produces discrete parallel tracks that extend across the width of the tape and are successively spaced along the length of the tape.

While the transverse scanning of the transducer significantly increases the amount of information stored on a tape, it will be appreciated that the high relative speed of the transducer, coupled with contact between the tape and the transducer, also increases the amount of wear to which the tape and the transducer are subjected. In an effort to minimize this wear, solid state scanning transducers have been developed. In place of mechanical movement of the transducer, solid state transducers utilize magnetic and/or electronic means to selectively control the location of a limited portion of the transducer through which the signal flux is transferred between the transducer and the medium. In some known arrangements, this limited portion is defined by a control flux that selectively saturates portions of the transducer while leaving adjacent portions unsaturated. The signal flux only flows in the unsaturated portions of the transducer, and thus is confined to a limited area. In the context of the present invention, this limited area of the transducer, through which flux is coupled between the transducer and the recording medium, is referred to as a "signal transfer region". By varying the control flux to vary the location of the saturated portions along the width of the transducer, the signal transfer region is scanned across the transducer. Different types of solid state scanning transducers which operate in this manner are disclosed, for example, in U.S. Pat. Nos. 3,391,254, 3,435,440, 3,555,204 and 4,322,763.

As illustrated by these exemplary patents, the control flux can be employed in different manners to effect the scanning of the signal transfer region. In another type of solid state scanning transducer, different from those described in these exemplary patents, the signal transfer region is defined in a gap-less magnetically permeable body of material that is distinct from the magnetic core itself. The present invention is concerned with this latter type of transducer. In this particular type of solid state scanning transducer, the control flux established in the magnetic core is coupled by a non-magnetic gap into the distinct body of magnetic material located magnetically proximate the recording medium and the core. This body of material bridges the gap of the core, and is referred to herein as a "keeper". The keeper defines a path for the flux which leaves the core as a result of its non-magnetic gap. To effect scanning of the signal transfer region, the control flux is generated with a gradient along the width of the gap. At the locations of higher flux density, the control flux can be sufficient to selectively saturate portions of the keeper material. The selective saturation of the keeper material effectively limits the regions within which the signal flux can flow between the transducer and the keeper body.

To effect recording of the information in this type of transducer, the signal flux flowing within the keeper is coupled from the face of the keeper into the magnetic recording medium. During playback, only that flux which emanates from the recording medium and enters the keeper in the confined area of the signal transfer region is detected by the signal winding.

Thus, rather than the entire width of the transducer being used to record and/or reproduce information, only a limited portion of its width is employed to record or reproduce information at any one instant. By varying the gradient of the control flux along the width of the transducer, the location of the signal transfer region of the keeper is varied. In this manner, the location at which the signal flux is coupled between the transducer and record medium is electronically and/or magnetically scanned along the width of the transducer to thereby cause different locations along the non-magnetic gap to effect transfers of information with respect to the record medium.

Further information pertaining to this type of transducer can be found in copending U.S. Pat. Application Ser. No. 085,676, corresponding to International Application Publication No. WO 87/03729, published on Jun. 18, 1987, the disclosure of which is incorporated herein by reference thereto. This type of magnetic transducing arrangement provides a number of advantages in the use of a solid state scanning transducer, and it is desirable to improve upon that arrangement. In one aspect, it is desirable to provide a solid state scanning transducer which does not rely upon magnetic saturation to effect the scanning of the signal transfer zone through which the signal flux flows. A scanning transducer which does not utilize magnetic saturation can operate with lower fluxes and therefore the power requirements of the transducer will be less. Furthermore, by using lower amounts of flux to define the signal transfer region, the sensitivity of the transducer is increased, since there is a smaller likelihood that low level and short wavelength information signals will be swamped out or demagnetized by the high control flux that may be required to produce saturation.

In another aspect, it is desirable to provide separate paths for the control flux and the signal flux, preferably in separate structures such that these fluxes only cross paths in the area of the signal transfer region of the keeper. By keeping these two types of flux separate from one another, interference between them is minimized, thereby further increasing the sensitivity of the transducer.

BRIEF STATEMENT OF THE INVENTION

In accordance with one aspect of the present invention, a solid state scanning transducer includes a core and a body of keeper material in which a signal transfer region is defined by a high flux region, which may or may not be saturated, adjacent to a low flux region. A source of control flux is coupled to the keeper to direct the control flux to flow through the keeper in opposite directions. The control flux is coupled to the keeper so that in some regions of the keeper, for example at the opposite ends thereof relative to the width dimension of the core, the oppositely directed flux flows do not influence one another, and thus the amount of flux in each direction is relatively- high. Furthermore, the control flux is coupled to the keeper so that in another region of the keeper, for example in the middle region thereof, the oppositely directed fluxes influence one another and tend to cancel each other, thereby resulting in a relatively low amount of flux. In this region a null zone is defined. In this null zone, the control flux is considerably less than in the regions of the keeper where oppositely directed control fluxes do not influence one another. As a result, the control flux in the null zone is sensitive to changes in the information flux emanating from the adjacent magnetic storage medium. This null zone therefore defines a signal transfer region. By varying the relative proportions of control flux flowing in the opposite directions, the location of the null zone can be varied along the width of the magnetic transducer to thereby move or scan the signal transfer region.

In accordance with another feature of the present invention, the information flux which is coupled from the magnetic storage medium into the signal transfer region of the keeper is not coupled into the magnetic core in the manner of a conventional ring head. Rather, this flux modulates a reference flux that is generated to link the core and the keeper, and this modulation produces a time varying voltage signal in a signal winding associated with the core, which signal represents the recorded information. In a preferred embodiment of the invention, the modulation of the reference flux is facilitated by forming the keeper body from a magnetically anisotropic material, having a hard axis of magnetization and a generally orthogonal, easy axis of magnetization. In a further preferred embodiment of the invention, the reference flux which is modulated comprises the control flux that defines the signal transfer region. This reference flux is induced in the magnetic core and is coupled from the core into the keeper body. The keeper body is oriented relative to the core gap so that the reference flux flows in the keeper body in a direction substantially along the hard axis of magnetization. In addition, the keeper body is oriented relative to the record medium so that the information flux which is coupled into the keeper from the magnetic storage medium flows in a direction substantially along the easy axis of magnetization. This information flux flowing along the easy axis of magnetization causes a change in the permeability of the keeper material along its hard axis of magnetization. The change in permeability produces a corresponding change in the reluctance of the keeper material, resulting in a change of the reference flux flowing along the hard axis. This flux change is detected in a signal winding or similar device that is magnetically coupled to the reference flux to thereby reproduce the magnetically recorded information.

Further features of the present invention, as well as the advantages offered thereby are explained in greater detail hereinafter with reference to preferred embodiments illustrated in the accompanying drawings.

BRIEF DESCRIPTION OF THE DRAWINGS

FIG. 2A is a view in elevation of the face of the keeper 20 of the transducer arrangement of FIG. 2, illustrating the flow of control flux in the keeper;

FIGS. 17A and 17B are views of portions of a tape record medium illustrating tracks having different recorded information formats;

FIGS. 18A and 18B are side views of a transducer arrangement in accordance with the present invention that is used to record information; and FIG. 19 is a front view of the keeper of the transducer arrangement of FIGS. 18A and 18B illustrating the operation of the transducer arrangement in a recording mode.

DESCRIPTION OF THE ILLUSTRATED EMBODIMENTS

Figure 1:
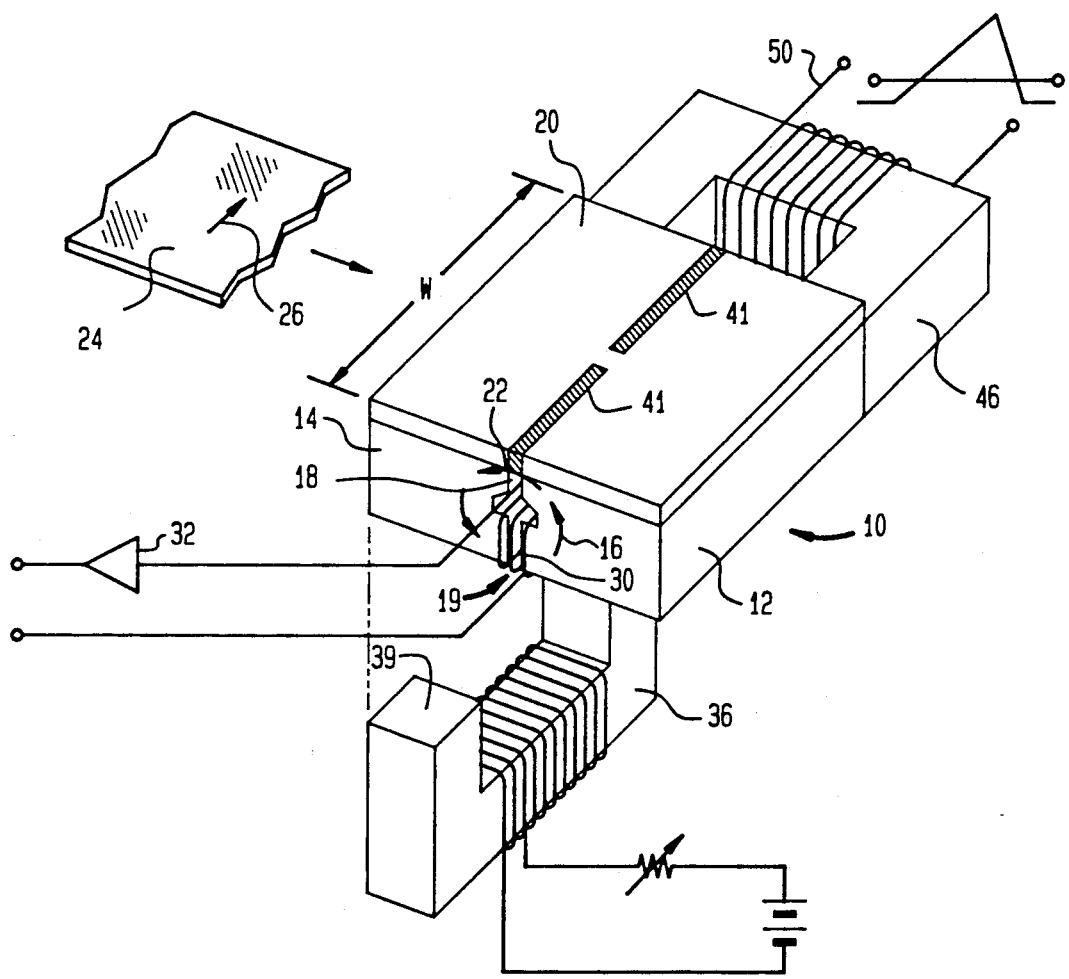
FIG. 1 is a perspective view of a magnetic transducer arrangement that is constructed and operates in accordance with the present invention.

To facilitate an understanding of the present invention and its operating principles, reference is first made to the embodiment of a transducer arrangement generally illustrated in FIG. 1. This illustrated embodiment is arranged to reproduce information which is stored on a record medium such as a magnetic tape in transverse tracks. The information can be recorded on the tape by means of a conventional, mechanically scanned head or by means of a solid state scanning head. It will be appreciated, however, that the principles of the invention are not limited to the particular illustrated embodiment. Rather, they are applicable to a variety of storage media and recording formats.

Referring to FIG. 1, the illustrated embodiment of a transducer arrangement incorporating the principles of the present invention includes a magnetic core 10 that is comprised of two pole pieces 12 and 14. The core 10 defines a path for the flow of magnetic flux 16. A non-magnetic gap 18 is provided between the two pole pieces at the front of the transducer. As illustrated in FIG. 1, the gap 18 can comprise a physical gap between the two pole pieces. If desired, the gap can be filled with any suitable non-magnetic material, such as glass, for example, to increase the strength and integrity of the overall core structure. The non-magnetic gap causes the flux 16 to flow outwardly away from the core at the location of the gap, in accordance with well known magnetic principles. To facilitate manufacture of the core, a similar gap 19 can also be provided between the pole pieces at the rear of the core.

The transducer arrangement also includes a body of magnetic material 20 that is located at the face of the core in magnetic proximity to the front gap 18. This body of material 20 bridges the gap 18 in the core, and forms a path for the flux 22 which is coupled from the core. This body of material 20 is referred to herein as a "keeper". The keeper 20 can be in direct contact with the pole pieces 12 and 14. For example, it can be formed on the pole pieces by any suitable deposition technique. Alternatively, it can be separated from the core by a thin layer of non-magnetic material such as glass or an air space. In this case, the thickness and area of the separation is preferably dimensioned so that it presents a lower reluctance to the flow of flux than does the gap 18.

A magnetic recording medium, such as a magnetic tape 24, passes adjacent to the keeper 20 on the side opposite the magnetic core 10. The magnetic tape 24 contains magnetically recorded information in the form of magnetic states having particular orientations. For purposes of illustration, a single magnetic state 26 is illustrated in FIG. 1. In operation, information flux is coupled from the tape and into the keeper 20.

In embodiments of transducers which included a keeper, such as described in the International Application Publication No. WO 87/03729, the information flux from the tape flows in a continuous path from the keeper on one side of the gap 18, around the core 10, back to keeper on the other side of the gap 18, and then return to the tape. As this flux flows around the core it is sensed in a conventional manner, to reproduce the recorded information. In the transducer of the present invention, however, the information flux from the magnetic tape 24 does not flow through the core 10. Rather, the keeper 20 forms a closed loop path with the magnetic tape 24 for the flow of the information flux. Within the keeper 20, the direction of the information flux from the tape is transverse to the direction of the flux 16 coupled from the core 10 into the keeper 20. Preferably, these two fluxes flow through the keeper 20 along perpendicular paths.

As explained in greater detail hereinafter, the flow of information flux through the keeper 20 changes the reluctance of the keeper and causes a modulation of the magnitude of the flux 16 flowing in the core 10. This modulation in the magnitude of the flux 16 is sensed by a signal winding 30 wound about the core 10 to be linked by the modulated flux. A changing current or voltage is induced in the winding 30 as a result in changes in the flux 16 of the core 10, and this voltage or current is coupled to a suitable preamplifier 32 or the like and associated processing circuitry (not shown) to retrieve the information reproduced from the record medium for use by a utilization device. Alternatively, the changes in flux 16 caused by the flow of the information flux in the keeper 20 can be sensed by any other suitable device that is responsive to changes in magnetic flux, such as a Hall-effect device or a magneto-resistive element incorporated within the structure of the core 10, for example in the rear gap 19.

In accordance with one aspect of the present invention, the transducer arrangement is constructed to be selectively sensitive to information signal flux flowing at a predetermined location along the width dimension W of the gap 18, and insensitive to information signal flux at other locations along the gap. This result is achieved by means of a control core 36 which generates a control flux 34 in the transducer arrangement that is caused to flow within the keeper 20. Further description of this aspect of the invention is made with reference to FIG. 2 of the drawings.

Figure 2:
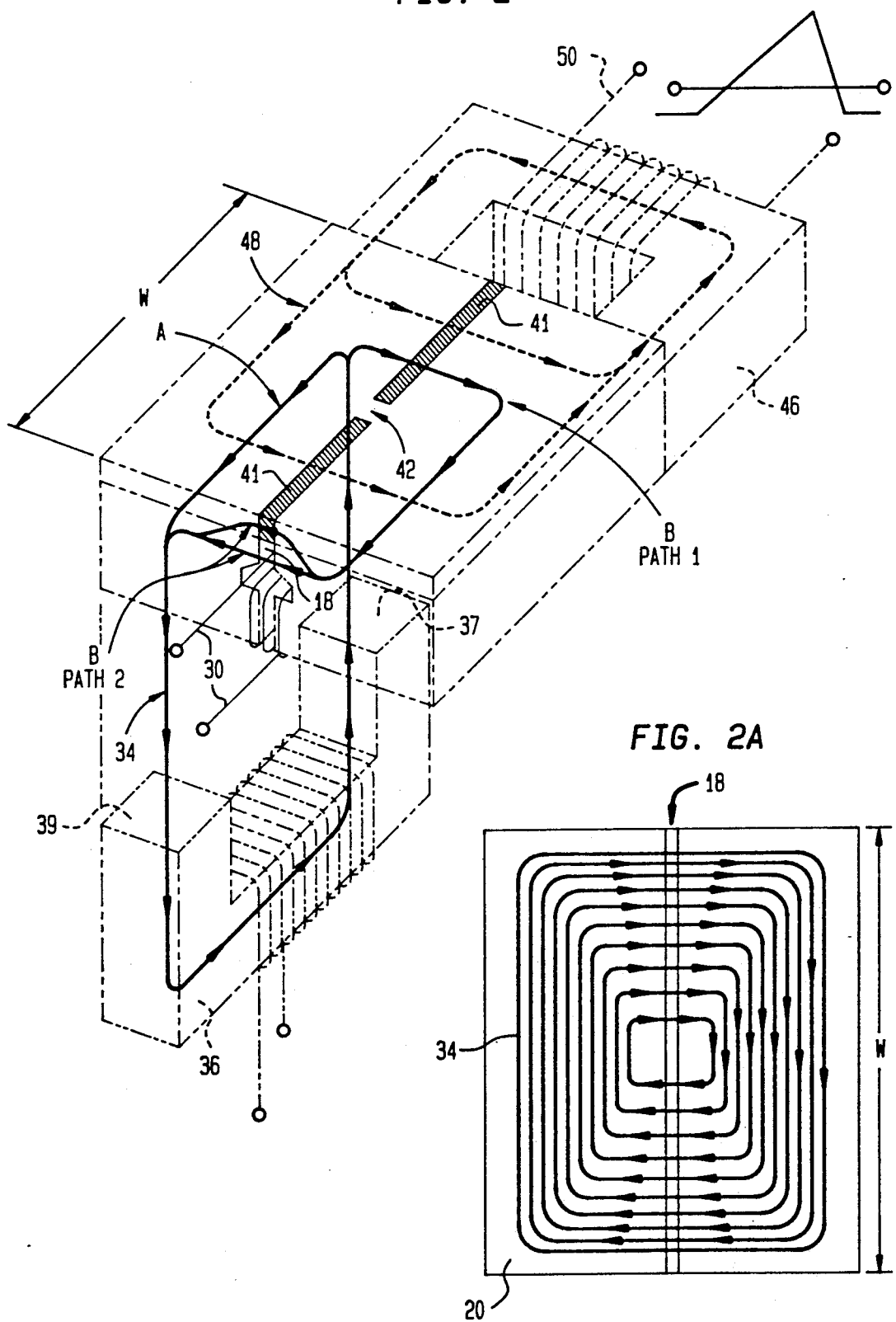
FIG. 2 is a view of the transducer arrangement of FIG. 1, illustrating the manner in which control fluxes are coupled to flow in the transducer to form a null zone for transferring information flux between the transducer and the record medium.

The control core 36 has two poles 37, 39 that are located on the same side of the gap 18 and are spaced from one another in the width direction W of the core 10. The control flux 34 that is generated by the core 36 flows along plural paths provided by the core and the keeper 20, as shown in FIG. 2. A portion of the flux flows directly from one pole 37 to the other pole 39 through the keeper 20 along a first path A. Flux flows along this path in a direction parallel to the gap 18 and does not cross a location adjacent to the gap 18 of the core. Another component of the flux follows a path B in the keeper 20, which path crosses the location of the gap 18. Depending on its location relative to the poles 37 and 39, the control flux on the path B flows across the gap 18 in different directions and with different magnitudes. In the portion of the keeper illustrated as being closest to pole 37 in the upper right-hand corner o the figure, the control flux 34 flows from left to right across the region of the gap 18, as indicated by the arrow labelled "PATH 1". In the portion of the keeper 20 closest to the pole 39 in the lower left hand corner of the figure, the control flux flows across the location adjacent to the gap 18 in a direction from right to left, as indicated by the arrow labelled "PATH 2". At the extremes of the keeper 20, relative to the width dimension W of the transducer, the amount of control flux is at its highest level. These regions of higher flux flow in the keeper 20, at the location adjacent the gap 18, are indicated by the shaded areas 41 in the figures. In the center of the keeper between these two extremes, the two oppositely oriented flux flows interfere with, i.e., buck, one another, and create a null zone 42 which is characterized by relatively low amounts of control flux.

This concept is further illustrated in FIG. 2A, which is a view in elevation of the face of the keeper 20. In this figure, the density of the flux lines in a region of the keeper is indicative of the amount of flux flowing in that region. Thus, at the upper and lower ends of the keeper, the amount of flux flowing in each of the two opposite directions is at its greatest. In these regions, the flux in one direction is not affected by the flux in the other direction. As one progresses toward the center of the keeper, however, the flux flowing in one direction is affected to a greater and greater extent by the flux flowing in the opposite direction, and therefore the amount of net, or resultant flux, is less. At the center of the keeper 20, the amount of flux flowing in the two opposite directions is equal, so that they cancel one another out and the net flux flow is zero. Thus, the amount of net control flux has a gradient across the width W of the keeper.

Referring again to FIG. 2, in the null zone the transducer arrangement is sensitive to the information flux that emanates from the tape 24. More particularly, the information flux flowing within the null zone 42 of the keeper 20 modulates the magnitude of the relatively low amount of control flux flowing in this zone. The changes in the magnitude of the control flux that are due to information flux flowing within this zone are detected by the signal winding 30. However, in regions outside of the null zone 42, the control flux 34 is at least equal in magnitude to the flux emanating from the tape 24, and can be much greater. As a result, changes in the information flux from the tape 24 do not affect the control flux as much and are not readily detectable. Therefore, the null zone 42 defines a signal transfer region through which information is received from the tape.

Figure 3:
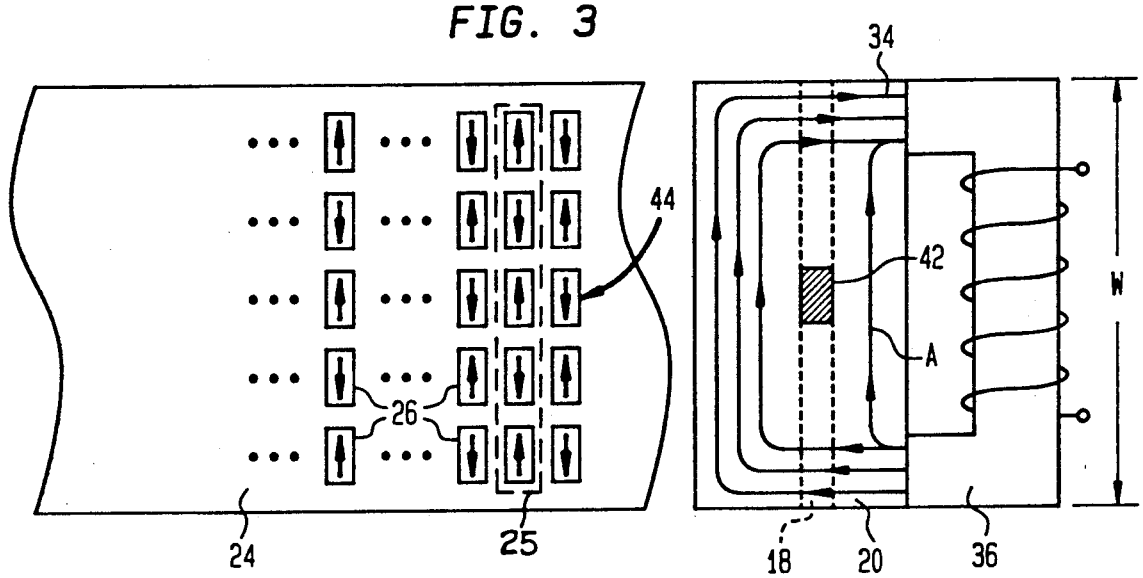
FIGS. 3 and 4A-4D are front and side views of the keeper of the transducer arrangement of FIG. 1 illustrating the manner in which the null zone is scanned along the width of the transducer.

In many environments, information is magnetically stored on a magnetic tape record medium in tracks that are oriented in a direction generally transverse to the direction in which the tape is transported relative to the transducer. Referring to FIG. 3, such tracks are illustrated as vertical columns of magnetic states 26 of differing orientations, which could be recorded by means of a mechanical or a solid state scanning transducer. With the arrangement illustrated in FIG. 3, in which the null zone 42 is located approximately in the middle of the transducer along its width dimension W, only the magnetic states at the center 44 of the vertically extending tracks are detected. The magnetic states at other locations in each track are not detected by the transducer due to the greater intensity of the control flux 34 outside the signal transfer region defined by the null zone 42. Thus, by employing a control flux to define a null zone, the transducer can be made to reproduce information from a selected segment of the storage medium.

In a further aspect of present invention, the signal transfer region can be scanned along the width of the gap. Referring again to FIGS. 1 and 2, this scanning of the signal transfer region is carried out in the illustrated embodiment by means of a scanning core 46 which generates a scan flux 48. The scanning core 46 is located relative to the core 10 so that the scan flux 48, like the control flux 34, flows across the body of the keeper 20 in a direction transverse to the width of the gap 18. Unlike the control flux 34, however, the scanning core 46 is positioned so that all of the scan flux 48 flows in the same direction across the gap 18. Such a result can be accomplished, for example, by locating the poles of the scanning core 46 on opposite sides of the gap 18.

Figure 4A:
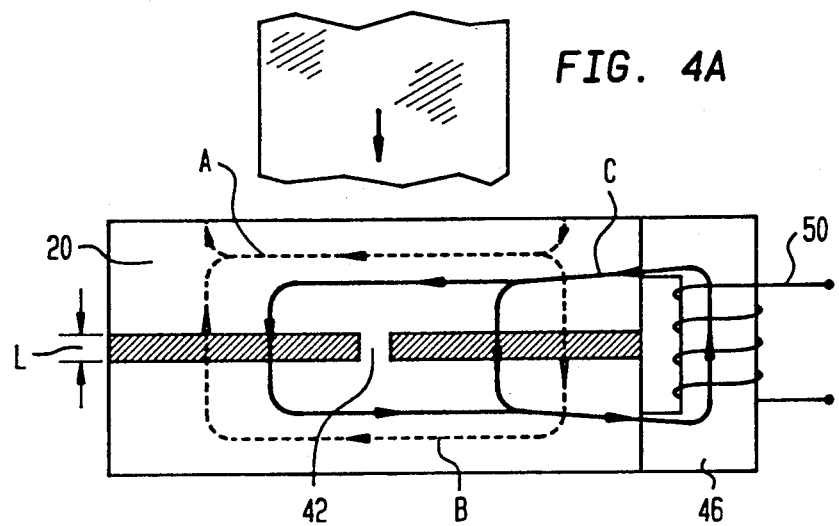
Figure 4B:
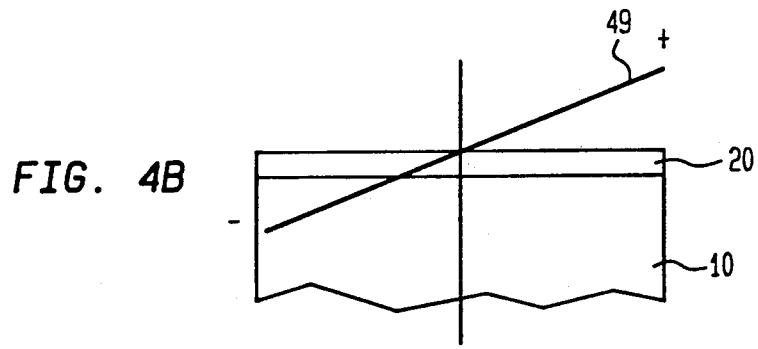
Figure 4C:
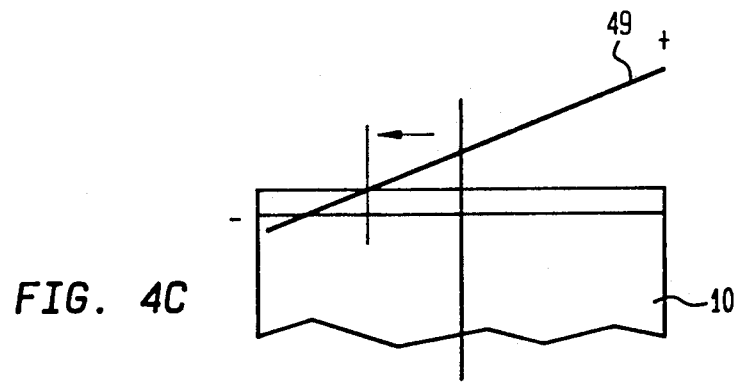
Figure 4D:
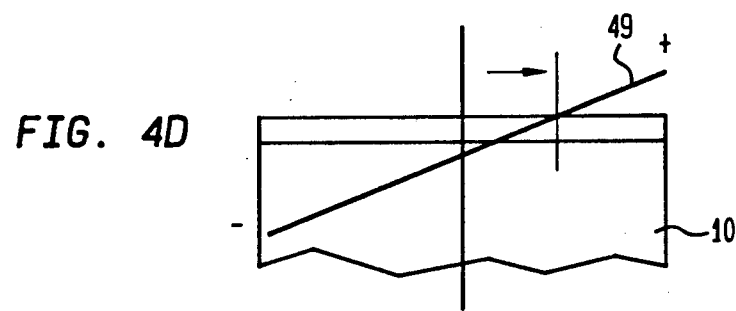

The effect of this scan flux is illustrated in greater detail in FIGS. 4A-4D. FIG. 4A is a plan view of the face of the keeper 20, illustrating the two paths A and B of the control flux in dashed lines and the path C of the scan flux in solid lines. FIGS. 4B-4D are side views of the keeper 20 and the core 10, with plots of the magnetic field gradient, represented by a line 49, superimposed thereon. The field gradient is the net result of the combination of the scanning and control fluxes 34 and 48, and is shown for three different conditions of scanning flux 48 in the three figures, respectively. In these plots, a positive value for the resultant field gradient represents a net flux flow along the length dimension L of the transducer in a direction from top to bottom in FIG. 4A (left to right in FIG. 2), and a negative value for the resultant field gradient represents a net flux flow in the opposite direction. For the particular condition illustrated in FIG. 4B, no scan flux from the core 46 is present, and an approximately equal amount of control flux generated by the control core 34 flows in opposite directions across the gap 18, as described with respect to FIG. 2A. As a result, the signal transfer region 42 is located at approximately the center of the width W of the transducer. However, when scan flux 48 is generated by the core 46 to flow in a direction from top to bottom in FIG. 4A, it is algebraically added to the control flux 34, as illustrated in FIG. 4C. As a result, the net flux, i.e. combined control and scan fluxes, flowing in a direction from top to bottom across the gap in FIG. 4A is greater than the net amount of flux flowing from bottom to top. Due to this change in the relative amounts of flux flowing in the opposite directions, the signal transfer region moves to the left, i.e., in a direction towards the lower flux. By increasing the amount of scan flux flowing from top to bottom, the signal transfer region can be caused to move farther to the left. Conversely, by changing the polarity and/or magnitude of the scan flux 48, as depicted in FIG. 4D, the signal transfer region can be caused to move to the right.

The foregoing net flux flows are obtained by controlling the magnitude and polarity of a current applied to the winding 50 of the scanning core 46, which in turn determines the position of the signal transfer region 42 along the width W of the gap 18. By applying a bipolar triangle or sawtooth type waveform to the winding 50, as schematically represented in FIGS. 1 and 2, the signal transfer region 42 is periodically scanned in a direction along the width W of the keeper 20. By scanning the signal transfer region in this manner, changes in the relative orientations of magnetic states 26 disposed along a transversely or vertically oriented track 25 on the tape 24, as illustrated in FIG. 3, can be individually detected, to thereby reproduce the information recorded on the tape.

The width of the null zone 42 can be controlled by varying the magnitude of the control flux 34 generated by the control core 36. This concept is further illustrated in FIGS. 5A and 5B. The null zone or signal transfer region 42 is defined as that portion of the keeper 20 in which the magnitude P of the control flux is less than a reference value $P_1$. Generally speaking, the value $P_1$ will be about equal to the magnitude of the flux coupled into the keeper from the tape or other record medium. Where the magnitude of the control flux is greater than this value, the reluctance of the keeper will not be affected by the flux from the tape, i.e., the effects of the tape flux will be effectively swamped out by the higher magnitude control flux. However, where the control flux has a magnitude that is about equal to or less than the coupled tape flux, i.e., in the null zone 42, the tape flux will be detectable by the transducer since it will affect the reluctance of the path of the control flux in the transducer. This area in which the tape flux can be detected defines the signal transfer region.

Figure 5A:
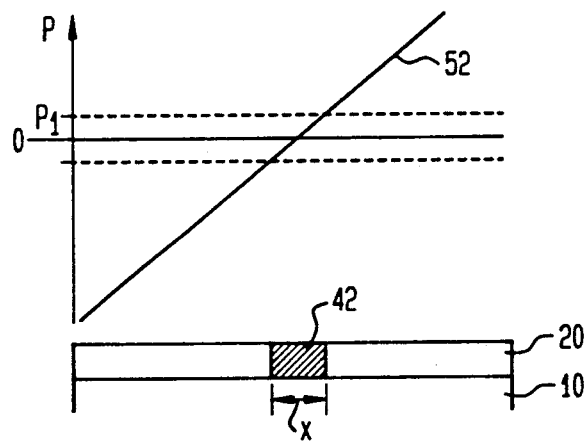
FIGS. 5A and 5B are views similar to FIGS. 4B-D illustrating the effect which the magnitude of the control flux has on the width of the signal transfer region.
Figure 5B:
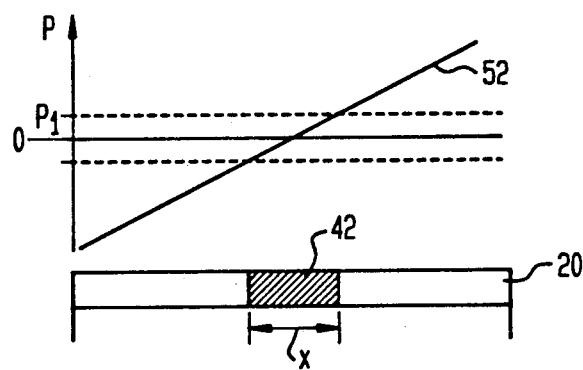

The width X of the null zone 42 is determined by the magnitude of the reference value P and the steepness of the control flux gradient, represented by the line 52 in FIG. 5A. The steepness of the control flux gradient is controlled by the magnitude of the control flux generated by the control core 36. For example, by decreasing the magnitude of the control flux 34 the gradient curve 52 will be "flattened out" as illustrated in FIG. 5B. As a result, the area of the keeper in which the magnitude of the control flux is less than the reference value $P_1$ will extend along a larger portion of the keeper's width W, resulting in a wider null zone 42. This result might be particularly desirable in situations where sensitivity to recorded information having a long wavelength is desired. In other words, the sensitivity of the transducer arrangement to long wavelength signals can be increased by decreasing the magnitude of the control flux.

Conversely, the width X of the null zone 42 can be decreased by increasing the magnitude of the control flux. This approach may be desirable where high packing densities are used in the recording of the information. In such a case, the control flux may be high enough to saturate the keeper at its outer edges in the region adjacent to the front gap 18. Whether the edges of the keeper are saturated or not is of no consequence to the operation of the invention, however, since the size of the signal transfer zone is defined by the location of low control flux density and is not dependent on saturation.

Figure 6:
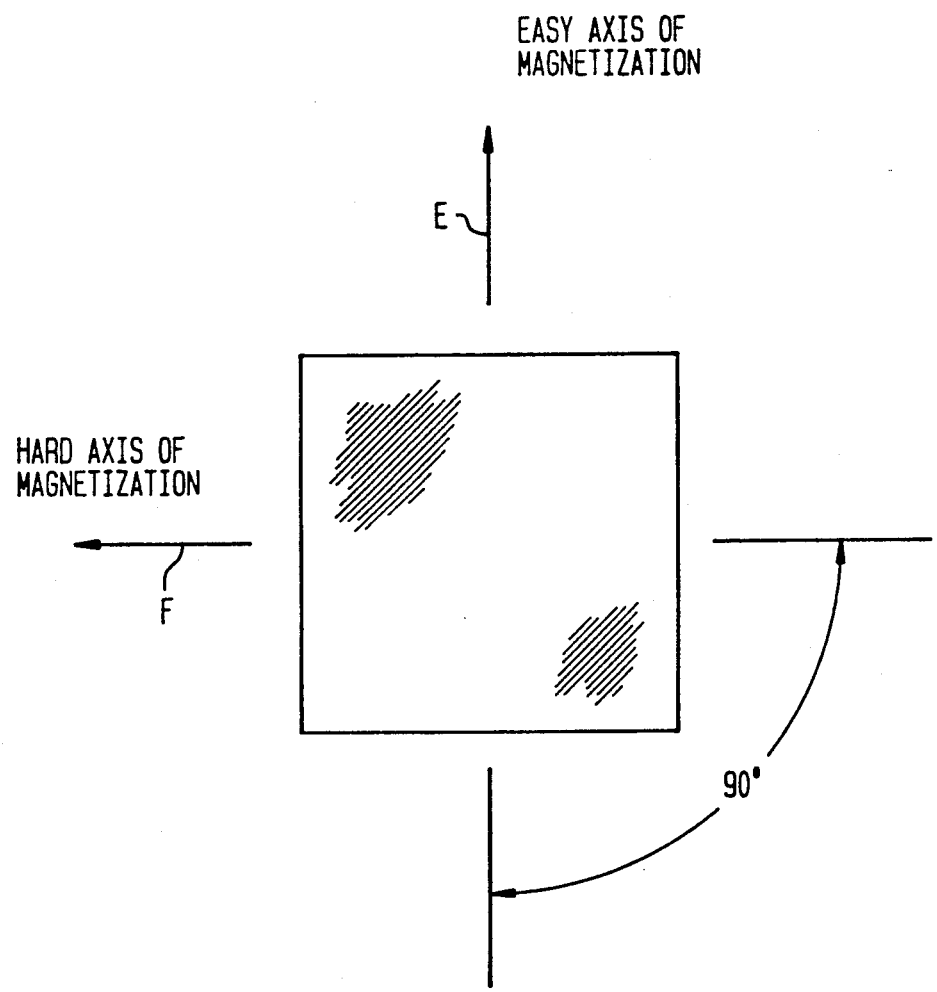
FIG. 6 is a general schematic diagram illustrating the hard and easy axes of magnetization in a magnetic material.

The manner in which the information flux 28 from the magnetic states 26 in the record medium 24 influences the reluctance of the path for the control flux is explained with reference to FIGS. 6-9. In a preferred embodiment of the present invention, the keeper 20 is constructed of a material which is magnetically anisotropic. Magnetic anisotropy is a term that is used to describe magnetic materials which exhibit a preferred direction of magnetization. Referring to FIG. 6, the preferred direction of magnetization of a magnetically anisotropic material is referred to as the easy axis of magnetization E and the non-preferred direction is labelled the hard axis of magnetization F. Typically, these two axes are oriented orthogonal to one another.

Figure 7:
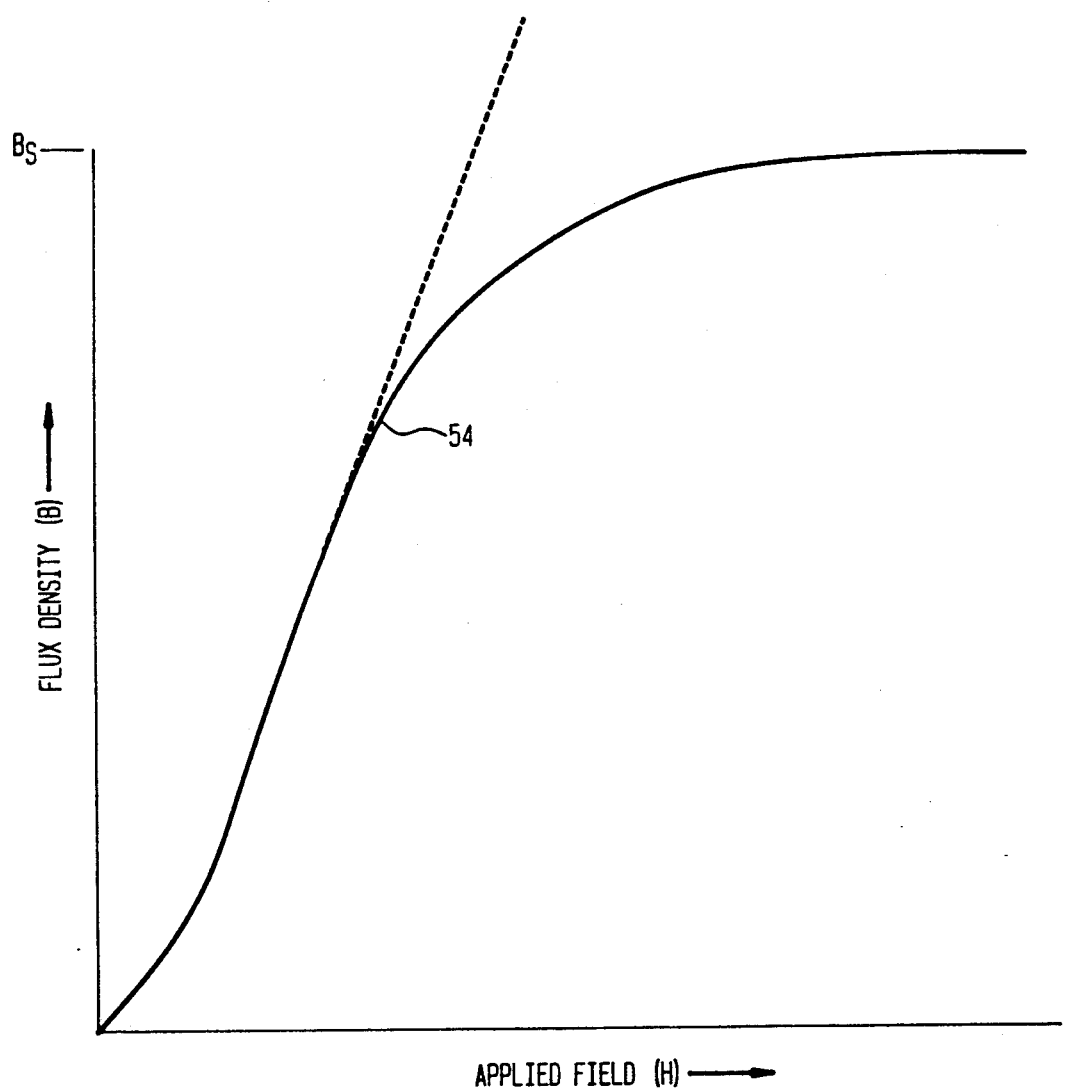
FIGS. 7-9 are B-H curves illustrating the effect which easy axis flux has on the permeability of the hard axis of magnetization.
Figure 8:
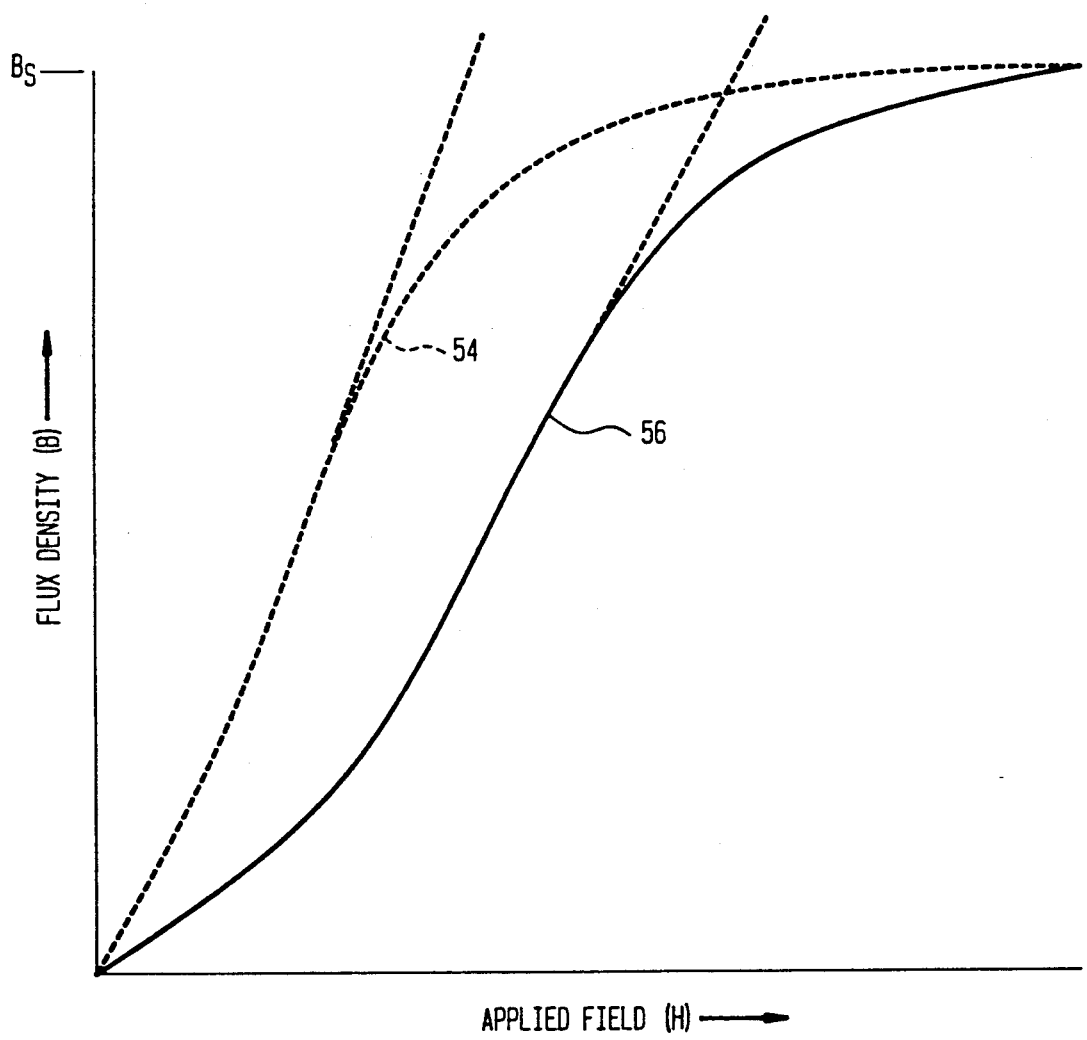
Figure 9:
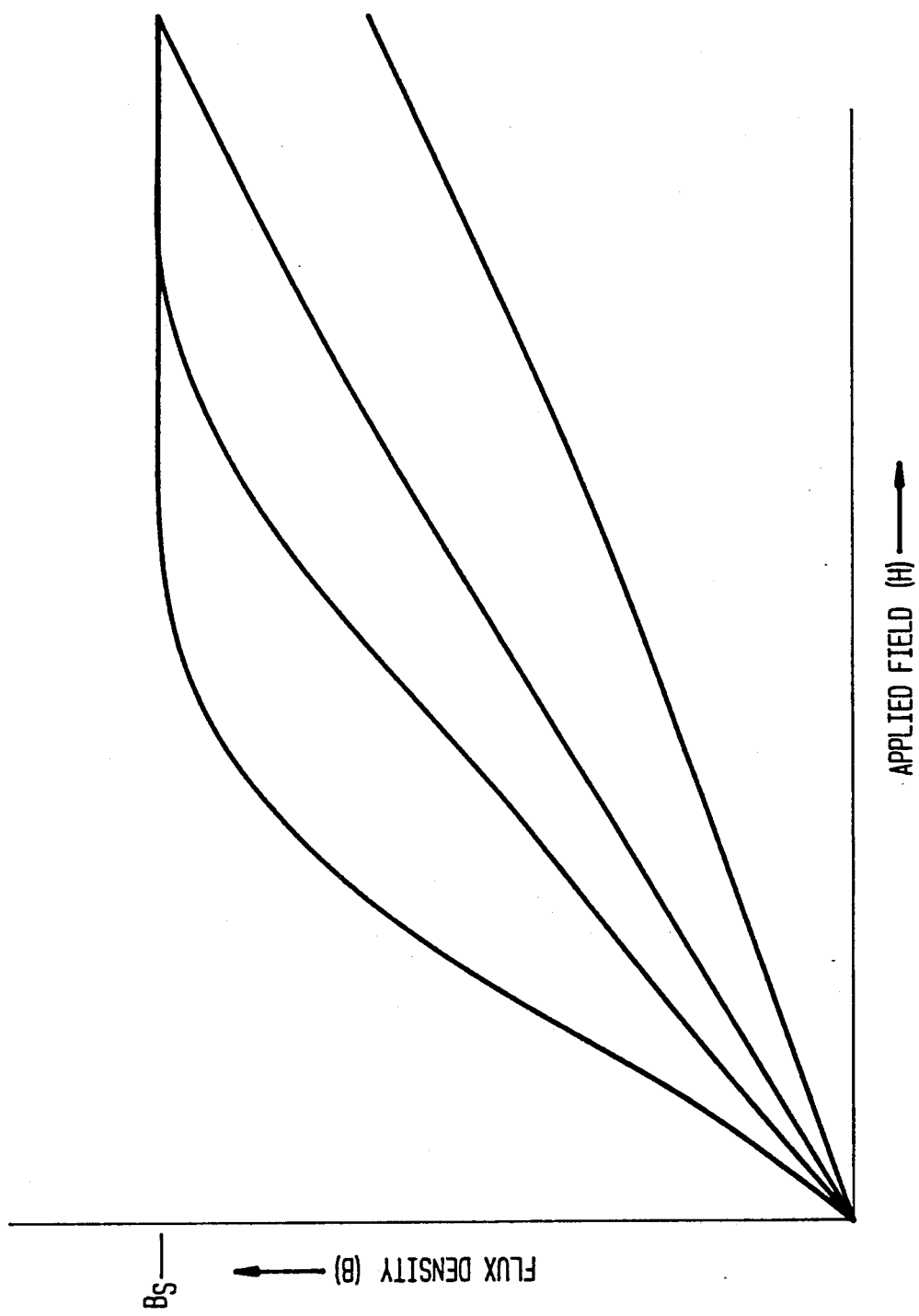

Referring to FIG. 7, the hard axis of magnetization is characterized by a relatively high level of permeability when no flux is flowing along the easy axis of magnetization, as represented by the solid line 54 in the B-H curve of FIG. 7. However, when flux flows along the easy axis of magnetization, the permeability of the hard axis is altered, as indicated in FIG. 8 by the solid line 56 relative to the original dotted line curve 54. In particular, the permeability of the hard axis will decrease in response to a flux flow along the easy axis, regardless of the direction of flux flow. Various examples of the hard axis permeability for different magnitudes of easy axis flux are shown in FIG. 9.

Figure 10:
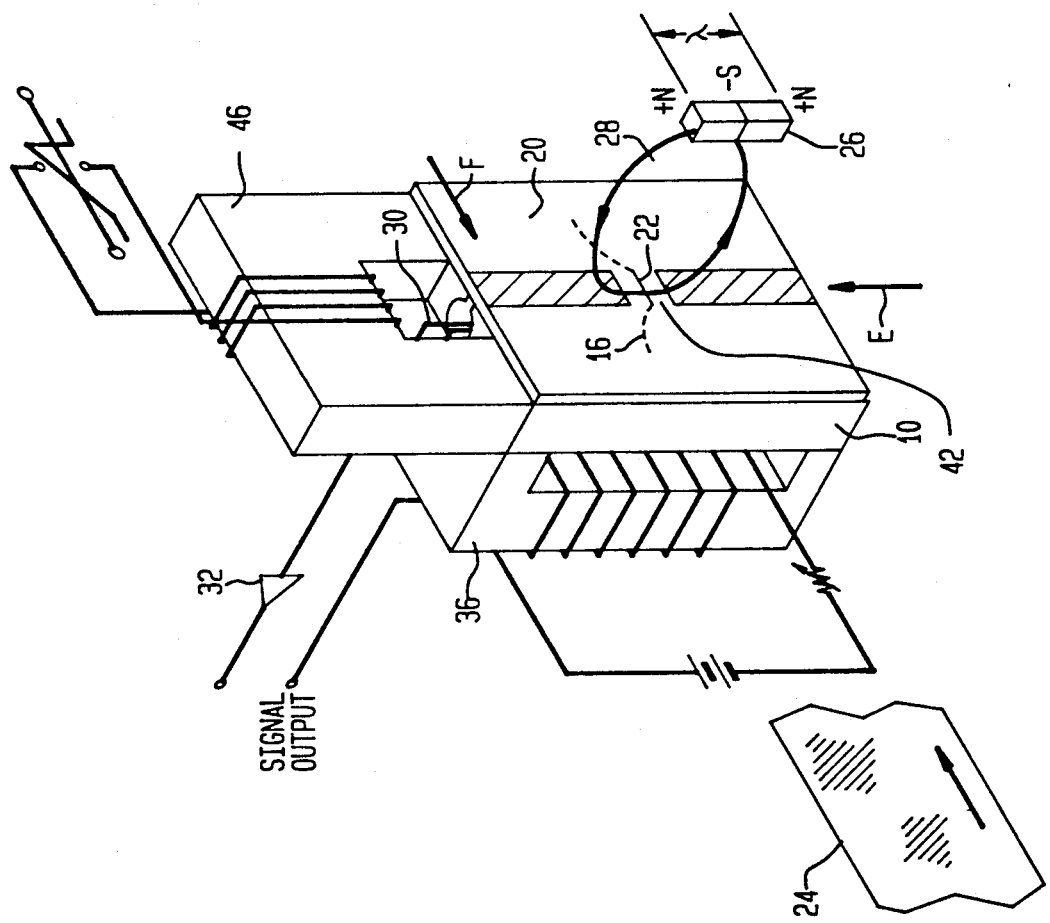
FIG. 10 is a perspective view of the transducer arrangement of FIG. 1 illustrating the relationship of the tape flux to the keeper magnetization axes.

Referring to FIG. 10, in accordance with one aspect of the present invention the keeper 20 is arranged so that its hard axis F is oriented substantially along the direction of flow of the flux 16 flowing through the core and across the gap 18, and the easy axis E of magnetization is oriented in the direction of the flow of signal flux 28 coupled into the keeper 20 from the tape. Thus, each time that a discrete magnetic state 26 (defined by opposite magnetic poles +N and −S) is adjacent the null zone in the keeper 20, the signal flux 28 from that state lowers the hard axis permeability of the keeper. The frequency of the changing permeability is a function of the scan speed and the wavelength λ of the recorded information. Since the keeper bridges the front gap 18 in the core 10, the reduction of the hard axis permeability produces a change in the front gap reluctance within the null zone 42. This reluctance change modulates the flux 16 flowing between the keeper and the core, in accordance with the changes in hard axis permeability of the keeper produced by the flux coupled into the keeper from the tape. This modulation of the flux 16 is sensed by the signal winding 30 and amplified in the pre-amplifier 32.

In the context of the present invention, the flux 16 flowing between the core 10 and the keeper 20 which is modulated by the information flux flowing along the easy axis of magnetization is referred to as a "reference flux". In the preferred implementation of the invention, the reference flux 16 is the portion of the control flux 34 flowing in the signal transfer region, and is thereby generated by the control core 36. As noted previously, the control flux 34 has a low density within the signal transfer region. Consequently, the permeability of the keeper within the signal transfer region undergoes larger changes in response to flux flowing along the easy axis of magnetization than in regions outside the signal transfer region. If desired, however, the reference flux could be generated by a separate source.

It should be noted that the keeper material need not be anisotropic in order for the information flux coupled from the tape to affect the reluctance of the path for the transversely-flowing flux from the core. However, in anisotropic materials this affect is much more pronounced, and for this reason it is preferable to use anisotropic materials in the implementation of the invention. For best results, the material which is chosen for the keeper should have a relatively low coercive force in the easy axis direction of magnetization. The lower the easy axis coercivity, the greater the shift in the permeability of the hard axis for a given amount of flux along the easy axis. As a result, the modulation of the reference flux is greater, thereby increasing sensitivity in the detection of the recorded information. Particularly suitable materials for the keeper are amorphous metals, such as Allied amorphous metal #2714 and cobalt zirconium niobium alloy. This latter material is preferred, since it is physically hard, and therefore wear-resistant, and it can be readily sputtered.

The sensitivity of the transducer can also be increased by making the keeper 20 as thin as practical. As the thickness of the keeper is decreased, a larger shift occurs in the permeability of the hard axis for a given signal flux flow. In addition, a thin keeper is less conducive to the generation of eddy currents. Preferably, the keeper has a thickness in the range of about 1 micrometer to about 3 micrometers.

Figure 11:
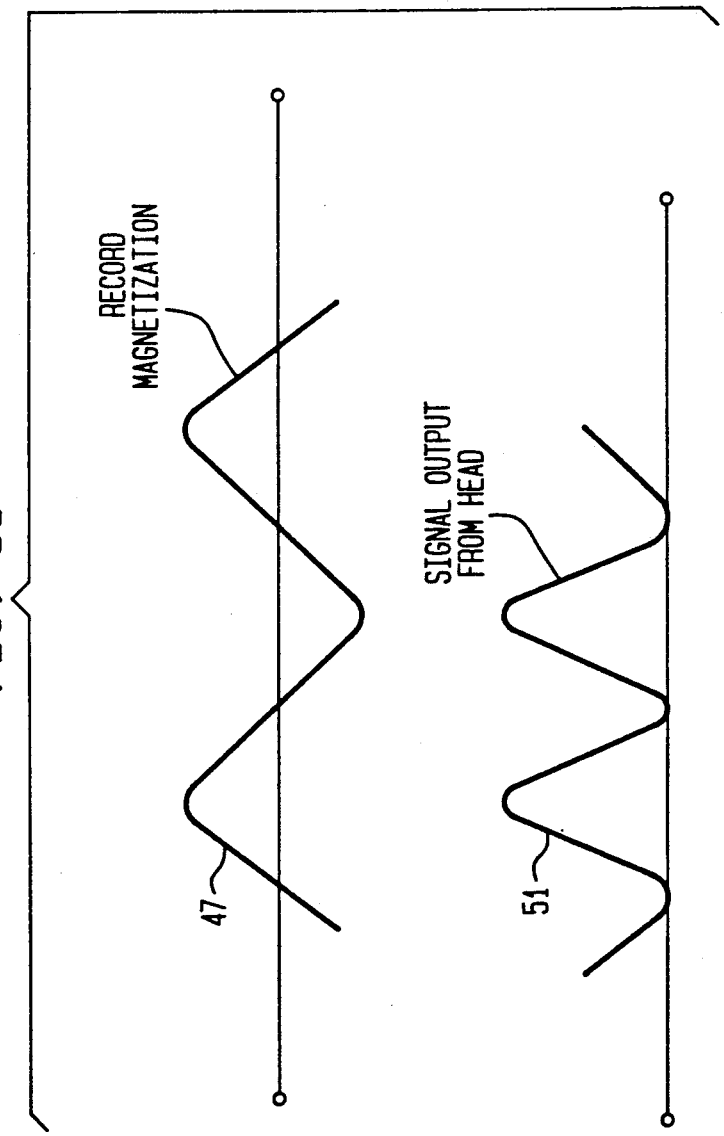
FIG. 11 is a graph illustrating the relationship of the signal recorded on the record medium and the signal reproduced from the information recorded in the medium.

As described previously, the effect of easy axis flux is unidirectional in that either a positive or a negative polarity of the recorded magnetization, when applied to the easy axis, will reduce the hard axis permeability. As a result of this phenomenon, the reference flux flowing in the core 10 and the keeper 20 is modulated each time there is a change in magnetic state on the tape 24. Referring to FIG. 11, the output signal 51 generated by the winding 50 as a result of changes in the permeability of the keeper will change from zero to a maximum twice for each cycle of the recorded information 47. Therefore, the frequency of the output signal is doubled with respect to the frequency of the recorded magnetization.

Figure 12:
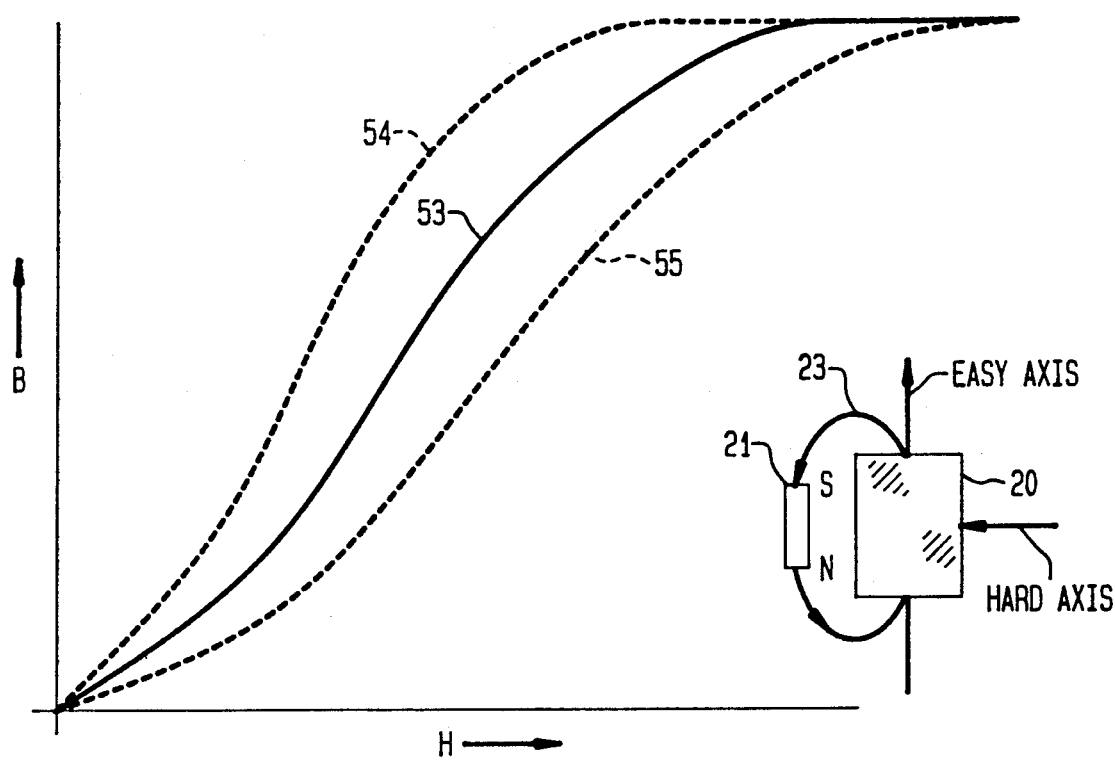
FIG. 12 is a B-H curve illustrating the effect of a bias flux coupled to flow along the easy axis of magnetization of the keeper of the transducer arrangement of FIG. 1.
Figure 13:
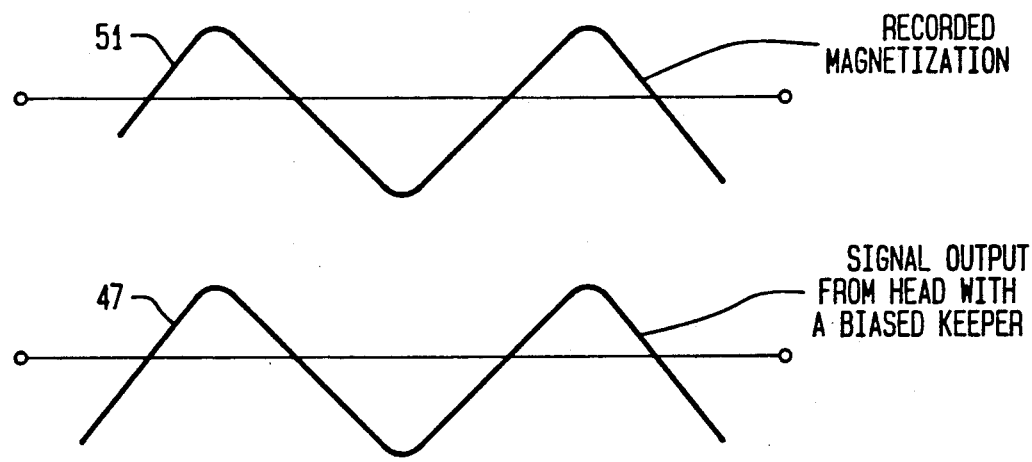
FIG. 13 is a graph illustrating the relationship of the recorded signal and reproduced signal from the recorded information when a bias flux is employed as illustrated in FIG. 12.

If it is desired to obtain a bidirectional swing of the hard axis permeability, a bias flux can be applied to the keeper along its easy axis of magnetization, i.e., in a direction transverse to the control and reference fluxes flowing along the hard axis of magnetization. Referring to FIG. 12, a slight bias flux 23 induced by a permanent magnet 21, for example, reduces the permeability of the keeper 20 from the dashed line curve 54 to the solid line value 53, in the absence of information flux coupled into the keeper from the tape. When flux from the tape is present it will be combined with the bias flux to shift the permeability from the solid line curve 53. Information flux which is of the same direction as the bias flux 23 will be added thereto to reduce permeability even further, as shown by the dashed line curve 55. Conversely, information flux of the opposite direction will counteract the bias flux 23 and cause the permeability to shift towards its original, higher value represented by the curve 54. With this arrangement, the frequency of the output signal 51 will be the same as the originally recorded information signal 47, as shown in FIG. 13.

Figure 14:
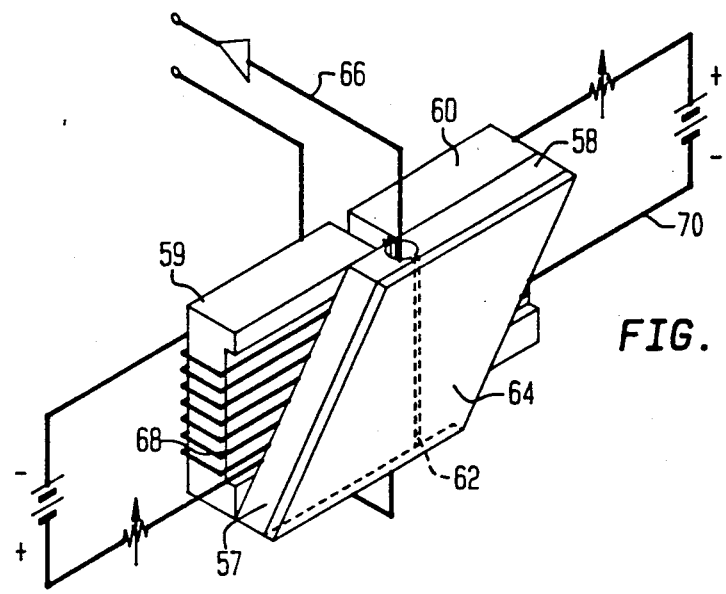
FIG. 14 is a perspective view of an alternative embodiment of a magnetic transducer arrangement in which a the null zone is scanned along the width of the transducer.
Figure 15:
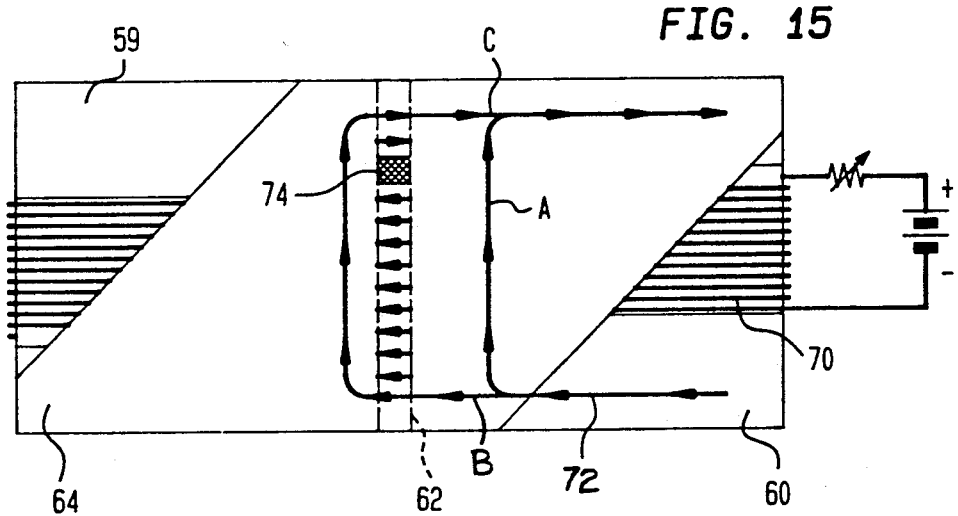
FIGS. 15 and 16 are further views of the embodiment of FIG. 14, illustrating the manner in which a reference flux determines the location of the null zone along the width of the transducer.
Figure 16:
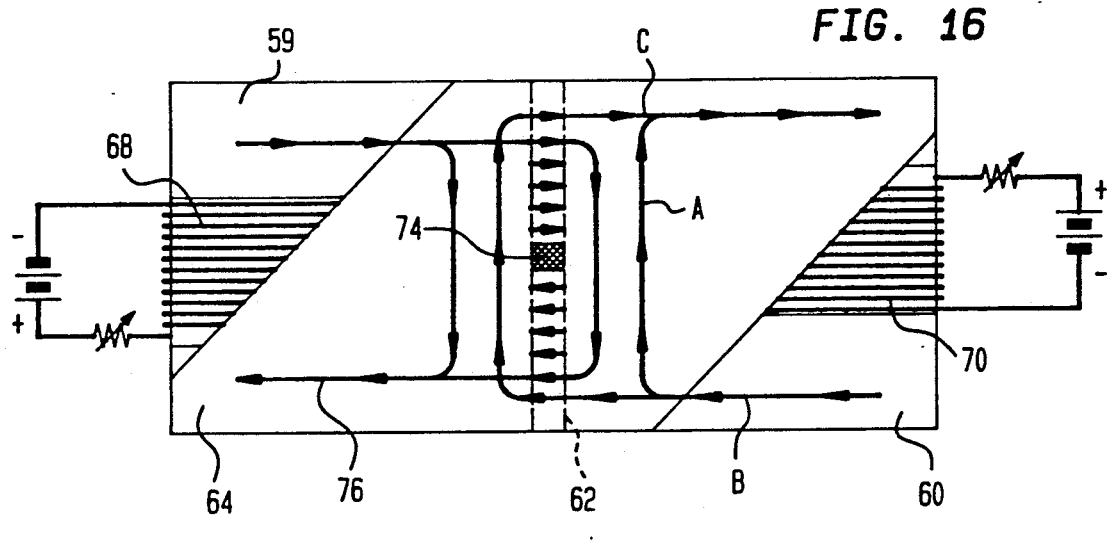

An alternate embodiment for producing a control flux gradient across the width of the keeper is illustrated in FIGS. 14–16. Referring to FIG. 14, a magnetic core is comprised of a pair of front cores 57, 58 and a pair of rear cores 59, 60. Each of the two front cores is in the shape of a wedge, with the orientation of the two wedges being in opposite directions relative to the width W of the transducer. A gap 62 is defined between the two front cores. A keeper 64 overlays the two front cores and bridges the gap 62. The shape of the keeper 64 is commensurate with the combined shape of the two front cores. A signal winding 66 is located within the gap 62.

The rear cores 59 and 60 have respective control windings 68 and 70 disposed about them. These rear cores generate control fluxes which flow through the front cores 57, 58 and through the keeper 64 in a direction transverse to the gap 62, analogous to the control flux 34 in the embodiment of FIGS. 1, 2 and 10.

The wedge shaped front cores 57 and 58 present oppositely oriented reluctance gradients to the control fluxes generated by the rear cores. The left front core 57 presents a reluctance gradient which increases in a direction from the top to the bottom of the transducer as illustrated in FIG. 14. Conversely, the magnetic reluctance of the right front core 58 increases from bottom to top.

The effect of these reluctance gradients is illustrated in FIGS. 15 and 16. FIG. 15 illustrates the control flux 72 which would be produced if current were fed into the control winding 70 of only the right rear core 60. A portion of the control flux 72 would follow a path A, which does not cross a region adjacent the gap 62 of the front cores. Another portion of the control flux 72 follows a path B in which it crosses a location adjacent the gap from right to left, and then returns to the core along a path C in which it again crosses the location adjacent the gap, but in a direction from left to right. Due to the increasing reluctance gradient of the front core 58 from bottom to top, a greater amount of flux flows across the gap from right to left than in the opposite direction. As a result, a null zone 74, created in the region where the two oppositely directed fluxes cancel one another, is located closer to the top of the transducer.

Since the wedge shaped left front core 57 is oriented in the opposite direction as the right front core, control flux 76 which is generated by the left rear core 59 and flows in this front core has the opposite effect. More particularly, with reference to FIG. 16, when equal amounts of current flow in both of the control windings 68 and 70, the amount of flux flowing in opposite directions across the gap 62 will be approximately equal, and therefore the null zone 74 will be located at approximately the center of the width dimension W of the transducer. If the amount of current in one of the control windings is increased, and/or the current in the other control winding is decreased, the location of the null zone 74 will shift in a direction determined by the winding having the greater amount of current. Thus, if the right control winding 70 has its current increased while the left control winding 68 has its current decreased, the null zone will shift upwardly, with reference to the example illustrated in FIG. 16. As the difference in current between the two windings increases, the null zone 74 will be located closer to the top edge of the transducer.

Referring again to FIG. 10, it is to be noted that the individual magnetic states 26 which are recorded on the tape are oriented in the same direction as the easy axis of magnetization of the keeper 20. Specifically, in the embodiment depicted in FIG. 10, the easy axis of magnetization extends in the direction of the width dimension W of the transducer, and the transducer is oriented so that the easy axis of magnetization extends in the same direction as the magnetic states 26 recorded in the magnetic medium, so that the flux 28 coupled into the keeper 20 from the tape 24 flows through the keeper 20 in this direction. Thus, the transducer is sensitive to information flux which flows in the direction of scanning of the signal transfer region 42. Typically, when the magnetic states are oriented in the direction of scanning, the record medium, e.g. tape, is referred to as being "longitudinally magnetized".

Although the embodiment illustrated in FIG. 10 is particularly suited for reproducing information which has been recorded in this format, it is not limited to such. Referring to FIGS. 17A and 17B, portions of tapes having two transversely oriented tracks 80 and 82 are respectively illustrated. In the tape shown in FIG. 17B, information is stored in the track 80 by means of longitudinal magnetization, since the magnetic states are oriented in the direction of extent of the track. In contrast, information is stored in the track 82 of the tape in FIG. 17A by means of transverse magnetization. In other words, the individual magnetic states are oriented horizontally, transverse to the direction of extent of the track.

For information recorded in the transverse format of FIG. 17A, it will be appreciated that the information flux from the recorded magnetic states will flow through the keeper 20 in a direction along the hard axis of magnetization of the keeper, rather than its easy axis of magnetization, when the track is directly aligned with the gap 18 of the transducer. As such, the modulation of the reference flux may be too small to be reliably detected while the track and the gap are in alignment. However, at the periphery of the track there exists flux flows which contain a component in the vertical direction. More particularly, as illustrated by the dotted lines 83 in FIG. 17A, adjacently recorded dipoles which are oriented in opposite directions establish a flux flow between them as illustrated by the dotted lines. The vertical component of these flux flows can be detected by the transducer arrangement of the present invention when the flux flows are aligned with the gap 18 of the transducer. In other words, to reproduce information which is recorded with a transverse magnetization as in the track 82, the actual scanning of the tape takes place when an edge of the track, rather than the center of the track, is aligned with the front gap 18 of the transducer. Thus, the transducer arrangement of the present invention can be used to reproduce information which is recorded with either a longitudinal magnetization or a transverse magnetization, such as that provided by many conventional, mechanically scanned, recording mechanisms.

A transducer arrangement in accordance With the present invention can be used to record information onto the tape as well as reproduce it therefrom. In recording applications, the magnetic anisotropy of the keeper material is also employed to effect the transfer of information between the transducer and the record medium. The major difference, of course, is that the information flux is coupled from the keeper into the record medium, rather than in the opposite direction as in reproducing applications. To provide such a flux flow, a source of information flux is coupled to the transducer arrangement. The information flux preferably is coupled so that it flows along the easy axis of magnetization of the keeper.

Referring to FIGS. 18A and 18B, two alternative arrangements for generating the information flux are shown. As shown in FIG. 18A, a signal core 84 with an associated signal winding 86 can be disposed around the main core 10 of the transducer. This signal core has its poles 88, 90 spaced in a direction along the width dimension W of the transducer, to thereby generate a flux 92 which flows through the keeper 20 along its easy axis of magnetization, i.e. in a vertical direction in the illustrated embodiment.

Rather than being disposed around the core 10, a signal core 94 can be situated on the side of the tape 24 away from the main core 10, as shown in FIG. 18B. Again, this core has its magnetic poles spaced in a direction along the width dimension of the transducer, to generate a flux which flows through the keeper along its easy (vertical) axis. This alternative arrangement may be more desirable since the signal core has a smaller size and is also less likely to affect the placement of the scanning core.

The manner of operation of the transducer in the recording mode is best explained with reference to FIG. 19, which illustrates the face of the keeper 20 for either of the embodiments shown in FIGS. 18A and 18B. To facilitate the explanation, the signal core 84 is illustrated as being disposed to the side of the core and keeper. As described previously, the control flux 34 from the control core flows across the keeper in two opposite directions to establish a low-flux signal transfer region 42. The control flux flows along the hard axis of magnetization of the keeper. Information flux 92 from the signal core 84 flows along the easy axis of magnetization of the keeper. In the regions of the keeper outside of the null zone 42, the control flux is greater in magnitude than the information flux. As a result, the flow of information flux has little or no effect upon the permeability of the keeper material. However, within the null zone 42 the control flux is quite low, and consequently the information flux 92 flowing along the easy axis of magnetization will have a more pronounced effect upon the permeability of the material. In particular, the permeability within the null zone 42 is reduced to the extent that some of the information flux 92 fringes from the keeper into the adjacent recording medium 24 to orient magnetic states in the medium and thereby store information.

Thus, through suitable control of the magnitude of the information flux relative to that of the control flux, a low permeability signal transfer region is established which causes the information flux to fringe from the keeper and be magnetically coupled into the record medium. Further, the location of the signal transfer region can be scanned along the width of the transducer, for example by means of a scanning core as described previously, to thereby record information at various locations across the width of the record medium.

It will be appreciated by those having familiarity with the pertinent technology that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A magnetic transducer arrangement for reproducing magnetically recorded information contained in the form of information flux that is coupled from a magnetic record medium into the transducer arrangement, comprising:
- a magnetic core including two poles having a non-magnetic gap between them;
- a body of magnetic material which is located to be in magnetic flux-coupling relationship with said core at said gap such that said core and said body of magnetic material together define a magnetic flux path;
- means for generating a control flux which flows in said body of magnetic material, said control flux defining a first region in said body at a location therein adjacent said gap in which the control flux has a magnitude equal to or less than a certain finite level and which includes a portion of said flux path, and at least one region in said body adjacent said gap in which the control flux has a magnitude greater than said level; and
- means for sensing changes in reluctance in said flux path which are caused by the information flux coupled into said first region of said body from said record medium.

2. The transducer arrangement of claim 1 in which said first region of said body defines a signal transfer region which forms a closed loop path with said record medium for flow of the information flux between said record medium and said body without flowing through said core.

3. The transducer arrangement of claim 1 further including means for adjusting said control flux to vary the location of said first region in a direction along said gap.

4. The transducer arrangement of claim 1 wherein said means for sensing changes in the reluctance in said flux path comprises means for inducing a reference flux in said core which flows along said flux path and is coupled into said body of magnetic material, and a winding disposed on said magnetic core for detecting changes in said reference flux caused by the information flux coupled into said first region of said body from said record medium.

5. The transducer arrangement of claim 4 wherein said reference flux flows through said body in a direction which is transverse to lines of information flux extending through said body.

6. The transducer arrangement of claim 5 wherein said reference flux and said information flux flow through said body in substantially perpendicular directions.

7. The transducer arrangement of claim 4 wherein said reference flux is induced in said core by said control flux generating means and flows in said first region of said body.

8. The transducer arrangement of claim 4 wherein said body is constructed of a magnetic material having an easy axis of magnetization and a hard axis of magnetization, and wherein said reference flux flows substantially along said hard axis of magnetization.

9. The transducer arrangement of claim 8 wherein said body of magnetic material is disposed relative to said core such that the information flux coupled into said first region of said body from said record medium flows in a direction that is substantially along said easy axis of magnetization.

10. The transducer arrangement of claim 1 wherein said first region of said body is comprised of an area of said body proximate said gap in which said control flux has a magnitude which is about equal to or less than that of the information flux coupled from said record medium, and said second region is comprised of an area of said body in which said control flux has a magnitude greater than that of the information flux coupled from said record medium.

11. The transducer arrangement of claim 1 wherein said magnetic core has a width dimension and said nonmagnetic gap extends along said width dimension, and wherein said control flux generating means comprises a second core having a pair of poles magnetically coupled to said magnetic core for generating said control flux therein, said poles of said second core being spaced from one another along said width dimension and being disposed to one side of said gap to thereby generate the control flux with a component which flows from one of said poles through a first part of said body adjacent said gap in a first direction transverse to said width dimension and flows to the other of said poles of said second care in a second part of said body adjacent said gap in an opposite direction and transverse to said width dimension.

12. The transducer arrangement of claim 11 wherein said first region of said body is located in an area between said first and second parts of said body where flow of the control flux in opposite directions buck one another to create a low flux zone.

13. The transducer arrangement of claim 12 wherein said control flux does not flow in either of said opposite directions in at least a portion of said low flux zone.

14. A magnetic transducer arrangement for transferring magnetically defined information with respect to a magnetic record medium, comprising:
- a magnetic core including two poles having a non-magnetic gap between them;
- a body of magnetic material which is located to be in magnetic flux-coupling relationship with said core at said gap such that said core and said body of magnetic material together define a magnetic flux path which crosses said gap, said body being constructed of a material having an easy axis of magnetization and a hard axis of magnetization, one of said axes being oriented in a direction substantially along said magnetic flux path where it crosses said gap; and
- means for generating a control flux which is coupled into said body of magnetic material at said gap to flow through said body in a direction that is substantially along said one axis, said control flux having a gradient in a direction along said gap to define a first region in said body at a location of flux density which is equal to or less than a certain finite level and which includes a portion of said flux path, and at least one other region in said body of flux density higher than said level.

15. The magnetic transducer arrangement of claim 14 further including means for adjusting said flux to vary the location of said first region in a direction along said gap.

16. The magnetic transducer arrangement of claim 15 wherein said means for generating the control flux includes a control core having a pair of magnetic poles for producing a flux which flows in a first portion of said body at said higher flux density in a first direction transverse to said gap and in a second portion of said body at said higher flux density in an opposite direction and transverse to said gap, such that said first region of said body is located between said first and second portions.

17. The magnetic transducer arrangement of claim 16 wherein said gap has a width dimension that is orthogonal to said flux path and the magnetic poles of said control core are spaced apart from one another in a direction parallel to the width dimension of said gap.

18. The magnetic transducer arrangement of claim 16 wherein said control flux adjusting means includes a third core having a pair of magnetic poles for producing a flux which flows in said body in only one of said directions transverse to said gap, and means for varying at least one of magnitude and polarity of the flux produced by said third core.

19. The magnetic transducer arrangement of claim 18 wherein the magnetic poles of said third core are respectively located on opposite sides of said gap.

20. The magnetic transducer arrangement of claim 14, further including a signal winding that is magnetically coupled with said flux path to detect changes in reluctance in said flux path.

21. The magnetic transducer arrangement of claim 20 further including means for generating a reference flux that flows along said flux path and said hard axis of magnetization in said body, and wherein said winding detects changes in said reference flux that are induced by changes in the reluctance in said flux path.

22. The magnetic transducer arrangement of claim 14 further including a signal core for generating information flux which flows along said easy axis of magnetization in said body of magnetic material.

23. A magnetic transducer arrangement for transferring magnetically defined information with respect to a magnetic record medium, comprising:
a magnetic core including two poles having a nonmagnetic gap between them;
a body of magnetic material which is located to be in magnetic flux-coupling relationship with said core at said gap such that said core and said body of magnetic material together define a magnetic flux path which crosses said gap, said body being constructed of a material having an easy axis of magnetization and a hard axis of magnetization, one of said axes being oriented in a direction substantially along said magnetic flux path where it crosses said gap; and
means for generating a reference flux which is coupled into said body of magnetic material at said gap to flow through said body in a direction that is substantially along said one axis.

24. The magnetic transducer arrangement of claim 23 wherein said one axis is the hard axis of magnetization.

25. The transducer arrangement of claim 23 wherein said means for generating the reference flux includes a core that is magnetically coupled to said flux path to generate a flux having a component which flows along said hard axis of magnetization.

26. The transducer arrangement of claim 25 further including a winding disposed on to said core for detecting changes in said reference flux.

27. The transducer arrangement of claim 23 further including a signal core for generating information flux which flows along said easy axis of magnetization in said body of magnetic material.

28. A magnetic transducer arrangement for reproducing magnetically recorded information contained in the form of information flux that is coupled from a magnetic record medium into the transducer arrangement, comprising:
a first magnetic core including two poles having a nonmagnetic gap between them;
a body of magnetic material which is located to be in magnetic flux-coupling relationship with said core at said gap, such that said body and said first magnetic core together define a magnetic flux path;
means for generating a control flux which flows in said body of magnetic material, said control flux defining a first region in said body at a location adjacent said gap with a magnitude of the control flux less than or equal to a certain finite level and which includes a portion of said flux path, and at least one region in said body adjacent said gap, having a magnitude of the control flux higher than said level; and
means for detecting changes in reluctance in said flux path which are caused by information flux coupled into said first region of said body from said record medium.

29. The transducer arrangement of claim 28 wherein said magnetic core has a width dimension and said nonmagnetic gap extends along said width dimension, and wherein said means for generating the control flux includes a second core having a pair of poles magnetically coupled to said first magnetic core for generating said control flux therein, said poles of said second core being spaced from one another along said width dimension and being disposed to one side of said gap to thereby generate the control flux with a component which flows from one of said poles of said second core through a first part of said body adjacent said gap in a first direction transverse to said width dimension and flows to the other of said poles of said second core in a second part of said body adjacent said gap in an opposite direction transverse to said width dimension.

30. The transducer arrangement of claim 29 wherein said first region of said body is located in an area between said first and second parts of said body where the flows of control flux in opposite directions buck one another to create a low flux zone.

31. The transducer arrangement of claim 30 wherein said control flux does not flow in either of said opposite directions in at least a portion of said low flux zone.

32. The transducer arrangement of claim 28 in which said first region of said body defines a signal transfer region which forms a closed loop path with said record medium for the flow of information flux between said record medium and said body without flowing through said first core.

33. A magnetic transducer arrangement for reproducing magnetically recorded information contained in the form of information flux that is coupled from a magnetic record medium into the transducer arrangement, comprising:
a magnetic core including two poles having a nonmagnetic gap between them;
a body of magnetic material which is located to be in magnetic flux-coupling relationship with said core at said gap, such that said body and said magnetic core together define a magnetic flux path;
means for generating a control flux which flows in said body of magnetic material, said control flux defining at least one first region in said body having a magnitude of the control flux which is greater than a certain finite level and a second region in said body having a magnitude of the control flux lower than or equal to said level, which defines a signal transfer region that includes a portion of said magnetic flux path and forms a closed loop path with said record medium for flow of the information flux between said record medium and said body without flowing through said core; and means for sensing changes in reluctance in said flux path which are induced by the information flux coupled into said first region of said body from said record medium.

34. A magnetic transducer arrangement for reproducing magnetically recorded information contained in the form of information flux that is coupled from a magnetic record medium into the transducer arrangement, comprising:

a magnetic core including two poles having a nonmagnetic gap between them, and a body of magnetic material having a variable permeability which is located to be in magnetic flux-coupling relationship with said poles at said gap, said magnetic core and said body of magnetic material together defining a magnetic flux path;

means for generating a control flux which flows in said core and said body of magnetic material, said control flux defining a first region having a magnitude of the control flux in said body adjacent said gap which is less than or equal to a certain finite level and which includes a portion of said flux path, and at least one region having a magnitude of the control flux in said body adjacent said gap which is higher than said level; and means for sensing changes in reluctance in said flux path which are caused by the information flux coupled into said first region of said body from said record medium.

35. The transducer arrangement of claim 34 in which said first region of said body defines a signal transfer region which forms a closed loop path with said record medium for flow of the information flux between said record medium and said body without flowing through said core.

36. A magnetic transducer arrangement for transferring magnetically defined information with respect to a magnetic record medium, comprising:

a first magnetic core including two poles having a nonmagnetic gap between them which extends in a direction of a width dimension of said core;

a body of magnetic material located to be in magnetic flux-coupling relationship with said poles at said gap and defining a magnetic flux path together with said core;

a second magnetic core having a pair of magnetic poles that are magnetically coupled to said first magnetic core to generate a flux that flow sin said body, said second magnetic core being located such that its pair of poles are spaced in the direction of said width dimension and both located to one side of said gap; and a third magnetic core having a pair of magnetic poles that are magnetically coupled to said first magnetic core to generate a flux that flows in said body, said third magnetic core being located such that said poles of said third magnetic core are spaced in a direction transverse to said width dimension and located on opposite sides of said gap.

37. The transducer arrangement of claim 36 wherein said second magnetic core generates a flux having a component which flows from one of said poles of said second magnetic core through a first pair of said body adjacent said gap in a first direction transverse to said width dimension and flows to the other of said poles of said second magnetic core in a second part of said body adjacent said gap in an opposite direction transverse to said width dimension.

38. The transducer arrangement of claim 37 wherein said third magnetic core generates a flux which flows through said body in one of said directions transverse to said width dimension and is combined with said component of flux generated by said second magnetic core.

* * * * *